E. W. CASH.
SPEED INDICATOR.
APPLICATION FILED DEC. 28, 1912.
1,102,319.
Patented July 7, 1914.
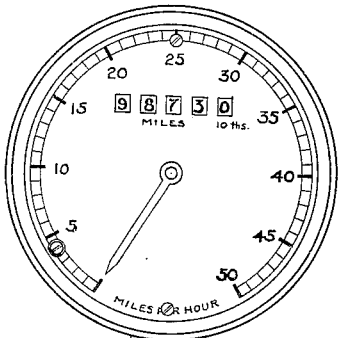
Fig. 1
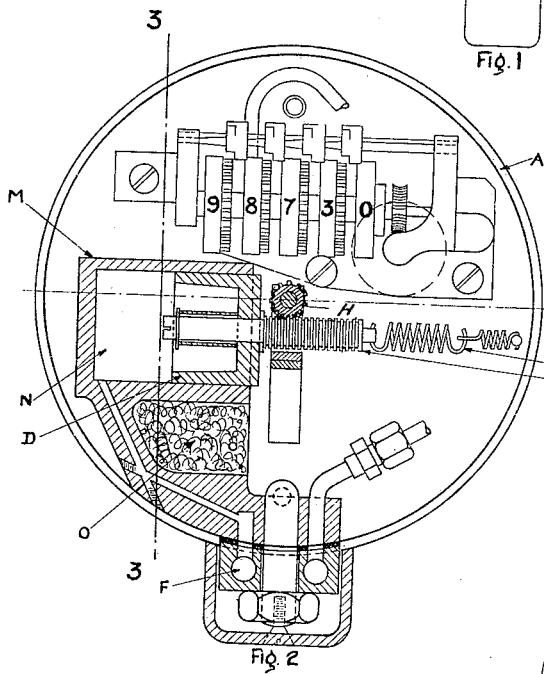
Fig. 2
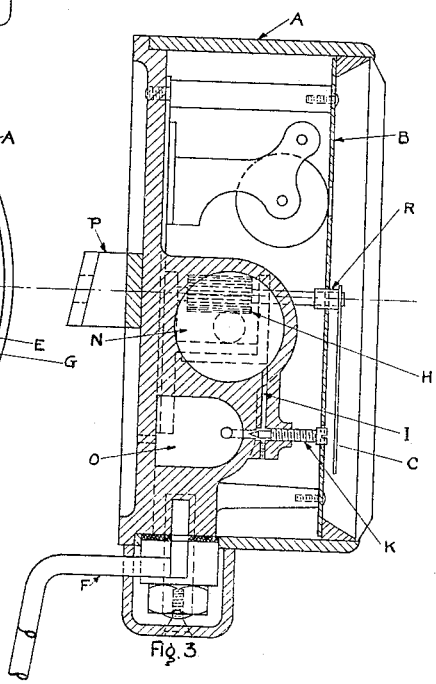
Fig. 3
Fig. 4.
WITNESSES:
David Barry
Paul T. Jaccati
INVENTOR
Ernest William Cash
BY
Ernest W. Corman
ATTORNEY

UNITED STATES PATENT OFFICE.

ERNEST WILLIAM CASH, OF HAMPTON WICK, ENGLAND.

SPEED-INDICATOR.

1,102,319. Specification of Letters Patent. Patented July 7, 1914.

Application filed December 28, 1912. Serial No. 738,988.

*To all whom it may concern:*

Be it known that I, ERNEST WILLIAM CASH, a citizen of Great Britain, residing at 26 Cedar road, Hampton Wick, in the county of Middlesex, England, have invented a new and useful Speed-Indicator, of which the following is a specification.

My invention relates to speed indicating instruments operated by a vacuum produced against a constant leakage by a vacuum pump which is driven by a wheel of the vehicle on which the speed indicator is attached.

The objects of my invention are first:—to provide a compact and simple indicating device of the above type which is so constructed that the parts are readily accessible for inspection and repair or renewal, and are well protected, and the air entering the instrument is thoroughly filtered before reaching the vacuum cylinder, thereby preventing the entrance of foreign matter. And, second:—to provide a speed recording instrument operated accurately by a vacuum instead of a flexible shaft, such as is in common use. I attain these objects by the mechanism illustrated in the accompanying drawings, in which—

Figure 1 is a front elevation of the complete instrument reduced in size. Fig. 2 is a sectional elevation through the axis of the vacuum cylinder and with the dial removed. Fig. 3 is a sectional elevation substantially on the line 3—3 of Fig. 2, looking from the left, and Fig. 4 is a detail view of the double-spring.

Similar letters refer to similar parts in all the drawings.

In carrying my invention into effect, I provide a cylindrical or other conveniently shaped casing A, such as is commonly used for gages and which can be readily attached to the dash board of a vehicle by means of the projection or bracket P, if the indicator is to be utilized for indicating the speed of the vehicle.

The casing is fitted with a face or dial over which the pointer moves. In Fig. 3 a dial is indicated by B and the pointer by C. The scale on the dial may be graduated to read miles per hour. Behind the dial is situated the mechanism which operates the pointer. This mechanism consists of the piston D carefully fitted in the cylinder N and held at the end of the cylinder with the pointer at zero, by means of the double spring E shown in Fig. 4. I make the spring E double, with a link within the coil of the small spring, so that the first part of the pull of the piston will be carried mainly by the smaller and lighter spring, and when the small spring has been extended the length of its inclosed link, then the pull of the piston will be thrown on the larger or stronger spring. This combination of springs prevents inaccuracies in pull and at the same time prevents any undue stress on the small spring. The construction of this double spring is clearly shown in Fig. 4.

The cylinder N is connected by the pipe F, with a suitable vacuum pump which is driven by the engine or a wheel of the vehicle. The cylinder N is also in restricted communication with the atmosphere through the pipe I and the chamber O, which is filled with filtering material indicated at O'. On the piston rod is formed a rack G, which extends around the surface which engages with the pinion H on the pointer spindle R. The rack G is made circular so that in case the piston should tend to twist or rotate in the cylinder, the pinion H will not be jammed but will continue to work accurately with the reciprocating movements of the piston.

As the pump which is connected to the pipe F produces a vacuum by exhausting the air from the cylinder N through the pipe F faster than it can enter through the pipe I, past the restricting screw or needle point valve K, the piston D moves along the cylinder against the action of the double spring E. This spring is made up of two springs of different degrees of tension connected together, one end being attached to the piston rod and its other end to the casing, in order that it may provide an even tension over a long range of action of the piston. As the piston moves in the cylinder toward the left, the rack G, rotates the pinion H, and the spindle R, on which the pointer C is mounted, and the pointer indicates on the dial the speed of the engine or vehicle.

As the vehicle or engine slows down, the pump will slow down correspondingly, the air entering the cylinder N through the pipe I, tends to destroy the vacuum. The double spring E pulls the piston back to its initial position in the cylinder as the vacuum decreases and the pointer moves back toward zero.

By means of the needle valve K the point of which is ground to fit a conical cup, the amount of air passing through the filter material in O, and the pipe I, into the cylinder N may be regulated so that the instrument can be made to record accurately over a wide range the speed of any engine or vehicle to which it might be attached. The degree of vacuum can be made proportional to the speed of the pump and therefore proportional to the speed of whatever drives the pump.

The casing M, for the piston D is a solid rectangular block of metal in which I bore the cylinder N and also the chamber O. It is convenient to cast these two cylinders integral with the base of the casing in brass or other metal. The piston may be made of brass, graphite or an alloy. I find by experience, however, that an alloy of antimony and lead is preferable as it compensates for alterations in the lengths of the springs, rack, etc. due to variations in temperature and tends to keep the instrument accurate through wide ranges of temperature.

In order to always maintain nearly an air-tight fit between the cylinder and piston at all temperatures and also to compensate for the differences in length of the spring which is attached to the piston so that the pointer C will read accurately at all temperatures and speeds, it has been found from experience that by making the piston of an alloy composed of 85% of antimony and 15% of lead the coefficient of expansion of the piston is slightly less than the coefficient of expansion of the brass cylinder in which the piston is located, thereby compensating for any leakage between the cylinder and piston and the differences in length of the spring at different temperatures. By adjusting the fit between the cylinder to compensate for the differences in length of the spring at all temperatures, the instrument can be made to read accurately at all speeds and temperatures. It is clear that the spring will be weaker if elongated by increased temperature and therefore the fit between the cylinder and piston must vary as the tension of the spring varies in order to make the instrument accurate. A balanced effect is therefore always maintained between the fit of the piston and tension of the spring whereby the speed of the vacuum pump is accurately measured by the instrument, and consequently the speed of the vehicle which drives the pump.

The chamber O, which is designed to receive filtering material and with one end open to the air, may be filled with cotton wool, felt, or any other suitable material. The air passes the length of the chamber O through the filtering material before it can pass by the needle valve K into the pipe I and enter the cylinder N. It is important to filter the air well to prevent any grit or foreign matter from lodging about the point of the valve K and clogging the passage, or getting into the cylinder N to interfere with the free and accurate movements of the piston D.

What I claim is:—

1. A speed-indicator, having, in combination with the casing thereof, a cylinder, a piston having an air-tight fit in the cylinder, a piston-stem connected to the piston, a pointer a rack-and-pinion device connected to the piston-stem to operate the pointer, a device comprising two springs connected together of different degrees of tension to provide a uniform motion for the piston over a long range, and connected to the rack at one end and to the casing at its opposite end to compensate for the travel of the piston, a needle valve device to vary the degree of rarefaction in the cylinder, whereby, when the air is exhausted from the cylinder, a balanced effect is produced on the piston.

2. A speed measuring instrument, comprising an inclosing casing, a cylinder, a piston for the cylinder composed of an alloy to compensate for the expansion and contraction of the cylinder at different temperatures, a pointer, operating means between the piston and pointer, devices attached to the operating means to balance the movements of the piston, means to vary the flow of air to the cylinder to destroy the vacuum therein, and a filtering chamber for the incoming air, as described, whereby when the air is exhausted from the cylinder a balanced effect will be produced on the piston.

3. In a speed measuring instrument, the combination with a casing, of a cylinder, a piston therein, a piston rod, a pointer, means operatively connecting the pointer with said rod comprising a rack on the piston rod, and a pinion engaging the rack, and a needle-valve to vary the flow of air to the cylinder.

4. In a speed-measuring instrument, the combination, a cylinder, a piston therein, a circular rack attached to the piston, a pointer, a pinion engaging the rack and to which the pointer is attached, a tension device consisting of two springs connected together of different degrees of tension and connected to the rack at one end and to the casing at its other end to control the movements of the piston and pointer, there being a restricted passageway to the cylinder, and a filtering chamber in communication with the passageway to the cylinder, whereby when the air is exhausted from the cylinder, the pointer will move in unison with the piston, as described.

Dated this 12th day of December, 1912.

ERNEST WILLIAM CASH.

Witnesses:
  THOMAS YOUNG,
  S. W. PHELPS.

Copies of this patent may be obtained for five cents each, by addressing the "Commissioner of Patents, Washington, D. C."